Feb. 14, 1933.  J. SQUIRES  1,897,536
PROPELLER
Filed Aug. 28, 1929
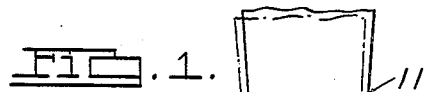
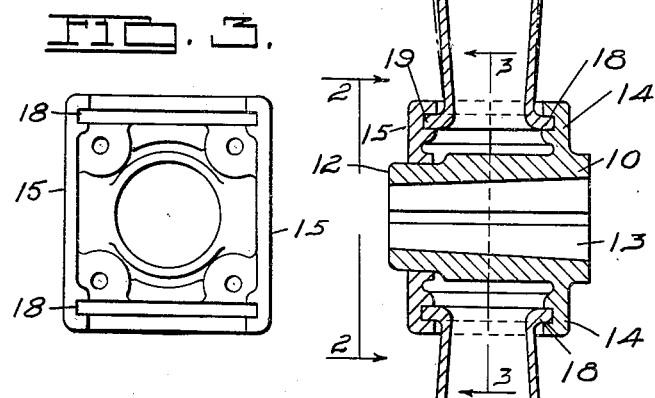
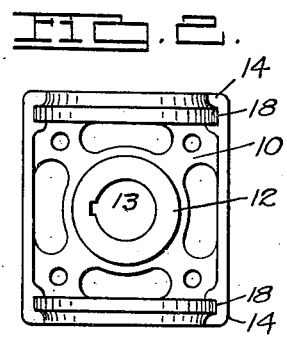
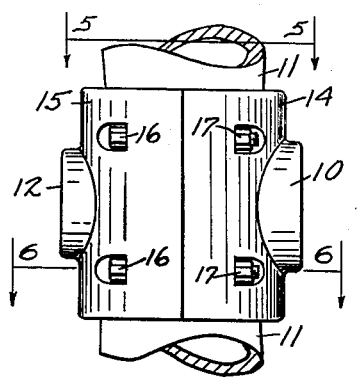
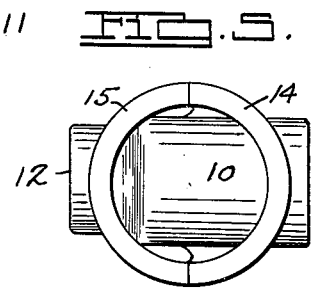
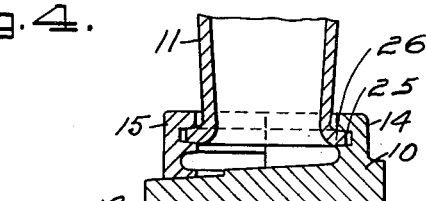
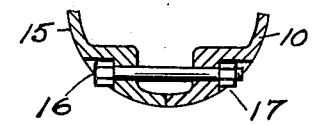
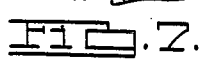
Inventor
John Squires.
By
Harness, Dickey & Pierce
Attorneys.

Patented Feb. 14, 1933

1,897,536

UNITED STATES PATENT OFFICE

JOHN SQUIRES, OF HAGERSTOWN, MARYLAND

PROPELLER

Application filed August 28, 1929. Serial No. 388,901.

This invention relates to propellers for aircraft generally, the principal object being the provision of a propeller having interchangeable, detachable, and adjustable blades.

Another object is the provision of a propeller having a blade mounting whereby the blades may be adjusted with little difficulty.

Another object is the provision of a simple blade mounting for airplane propellers better able to resist the stresses arising therein in use than conventional constructions.

Another object is the provision of a mounting for the blades of airplane propellers whereby the blades are subjected to a minimum of destructive stresses set up therein due to the centrifugal forces acting on said blades in operation.

Another object is to provide a novel construction for attaching a detachable metal blade to the hub of an airplane propeller whereby such blade may flex in service due to the forces acting therein without localizing the stresses set up in the blade due to such flexing within too narrow limits.

Another object is the provision of a novel means for attaching detachable blades to the hub of an airplane propeller.

A further object is the provision of certain novel features of construction that will be specifically pointed out, or will be obvious in the following application.

The above being among the objects of the present invention, the same consists in certain novel features of construction and combinations of parts to be hereinafter described with reference to the accompanying drawing, and then claimed, having the above and other objects in view.

In the accompanying drawing which illustrates the suitable embodiment of the present invention, and in which like numerals refer to like parts throughout the several different views, Fig. 1 is a fragmentary side view of an airplane propeller partly broken away for better illustration.

Fig. 2 is a view of the hub member taken as on the line 2—2 of Fig. 1, and without the blades.

Fig. 3 is a view of the hub cap member as taken on the line 3—3 of Fig. 1.

Fig. 4 is a side view of the hub showing the blades clamped therein, a fragment only of each blade being shown.

Fig. 5 is a plan view of Fig. 4, taken as on the line 5—5 of Fig. 4, with the blades being removed.

Fig. 6 is a fragmentary sectional view of the hub taken as on the line 6—6 of Fig. 4.

Fig. 7 is a fragmentary sectional view similar to Fig. 1 showing a modified form of construction.

In the conventional types of detachable metal blade airplane propellers, the blades are provided with cylindrical or approximately cylindrical attaching shank portions radially disposed with respect to the axis of the propeller hub. The propeller hub is provided with radially disposed sockets in which the blade shanks are adapted to be rigidly clamped over a material axial length thereof. In manufacturing these blades, it is not always possible, because of manufacturing limitations, to insure the center of mass of the blade coinciding with a line radial to the hub and coincident with the axis of the blade attaching shank. At high propeller speeds, centrifugal forces are set up within the blades which tend to cause the center of mass of the blades of the propeller to coincide with the axis of the blade socket and shank. When the center of mass of a blade is not coincident with the axis of the blade socket and shank, and assuming the axis of the socket and shank to be in true radial relation with respect to the hub, the blade tends to bend to move its center of mass into a position to coincide with the axis of the shank. Since the shank portion of the blades is held rigid, tendency of the blades to bend will set up stresses within the blades which localize in the shank at the outer edge of the blade sockets, and these stresses will eventually fatigue the metal of the blades at this point until breakage occurs. The blades of this type of airplane propeller are also subjected to bending and torsional stresses due to their reaction on the air. These stresses also tend to localize at the outer edge of the blade sockets and therefore accentuate the stresses above described which ultimately cause failure of the blades.

In view of the commercial difficulty of aligning the center of mass of the blade with the axis of its attaching shank, I deem it advisable, in order to overcome the failure of the blades in conventional constructions due to this reason, to provide a construction between the blade and the hub whereby the stresses set up in the blade due to this non-alignment will be distributed over a greater blade area than in conventional constructions, thus preventing localization of such stresses which is the reason for the failure of the blades in conventional constructions as above explained.

As illustrative of the present invention I show in the accompanying drawing a propeller comprising a hub member 10 provided with a pair of radially extending blades 11. The hub member 10 is preferably of forged construction and formed to provide a portion 12 serving as the hub proper and provided with a tapered axial opening 13 adapted to receive the driving shaft. Formed integrally with the portion 10 and projecting outwardly therefrom in diametrically opposite directions with their axes in true radial relation with respect to the axis of the hub 12 are two semi-circular socket members 14. A member 15 of semi-circular section is slidably but closely received on the end of the hub portion 12 and cooperates with each of the semi-circular socket portions 14 to complete the circular formation of the sockets. Bolts such as 16 extending through the member 15 and through the sockets 14 cooperate with nuts 17 to draw the member 15 into proper relationship with respect to the socket portions 14. Each socket portion 14 and the corresponding portion of the member 15 is interiorly provided with a groove 18 radially positioned with respect to the axis of the socket. The blades 11 are outwardly flared at their inner ends to provide outwardly extending flanges 19 radially disposed with respect to the axis of the blades, and these flanges 19 fit into and are received by the respective grooves 18. Clearance is provided between all other portions of the hub assembly and the blades 11.

The flanges 19 are of such a diameter that when the member 15 is drawn up against the socket portions 14 and into substantial contacting relationship therewith, the bottoms of the grooves 18 will firmly engage the outer edges of the flanges 19 and clamp such flanges and therefore the blades 11 against both axial and rotational movement with respect to the hub. The walls of the inner ends of the blades 11, while made of sufficient thickness to readily withstand any forces that may be set up therein, are preferably of no greater thickness than is necessary for this purpose, so that any flexure of this portion of the blade will result in a minimum of stresses set up within the metal of the blade itself. Furthermore, the point of juncture of the inner end of the blade 11 with the flanges 19 are preferably well radiused in order to prevent localization of stresses.

With this construction the extreme inner end of each blade is rigidly secured against movement, yet the construction is such that substantially the entire length of the inner ends of the blades may have a limited flexing movement as shown in dotted lines in Fig. 1 under the tendency of the outer ends of the blades to move due to the centrifugal forces and reaction of the blades upon the air as above described. The result is that in this construction instead of attempting to prevent flexing of the blade, which in conventional construction results in the localization of the stresses set up by such flexing tendency and thus causes ultimate rupture of the blades, I provide a construction designed primarily to permit such flexing, and therefore eliminate the localization of the stresses referred to, and thus eliminate to a great extent, the possibility of rupture from this cause.

The form of connection between the blade and the hub may, of course, be varied in different manners to achieve the same result; likewise the particular formation of the flanges 19 and grooves 18 may be varied without affecting the operativeness of the invention. One method of doing this is shown in Fig. 7 in which the grooves 18 in Fig. 1 are modified as at 25 so that the side walls thereof extend in converging relationship radially outwardly of the hub socket, and the flange 19 is modified as at 26 to conform to the shape of the grooves 25. In this case the outer circumference of the flange 26 will not, of course, be clamped against the bottom of the grooves 25, but clearance at this point is preferable with this construction. The result, however, is identical to that described in connection with the previous figures.

Formal changes may be made in the specific embodiment of the invention described without departing from the spirit or substance of the broad invention, the scope of which is commensurate with the appended claims.

What I claim is:

1. An airplane propeller comprising, in combination, a hub provided with a plurality of radially disposed sockets, and a hollow metal blade secured in each of said sockets, said blades each having a radially outwardly extending flange at its inner end forming the sole means for securing it in said socket.

2. An airplane propeller comprising, in combination, a hub having a radially disposed socket, said socket being interiorly grooved adjacent its outer end in a plane perpendicular to the axis of said socket, and a propeller blade comprising a body having a radially outwardly extending circular flange adjacent the inner end thereof received and clamped against movement within said groove, said body being spaced from the wall of the socket.

3. An airplane propeller comprising, in combination, a hub having a plurality of radially disposed sockets, each of said sockets being interiorly provided with an annular groove, a blade for each of said sockets, and an annular flange on each of said blades received and clamped against movement within the corresponding of said grooves and forming the sole means for securing said blades to said hub.

4. An airplane propeller comprising, in combination, a hub having a plurality of radially disposed sockets, each of said sockets being interiorly provided with an annular groove, a blade for each of said sockets, and an annular flange on each of said blades received and clamped against movement within the corresponding of said grooves and forming the sole means for securing said blades to said hub, said blades being free from contact with said hub except at said flanges.

5. An airplane propeller comprising, in combination, a hub having a plurality of radially extending sockets, each of said sockets being interiorly grooved perpendicular to the axis thereof, a blade for each of said sockets, each of said blades comprising a hollow shank portion terminating at its inner end in an outwardly flared circular flange merging into said shank in a smooth curve, each of said flanges being received in a corresponding groove, and means for drawing said sockets into clamping relationship with respect to said flanges, said blades being free of contact with said hub.

6. An airplane propeller comprising, in combination, a hub having a plurality of radially extending sockets, each of said sockets being interiorly grooved perpendicular to the axis thereof, each of said sockets being formed in two parts one of which is integral with said hub and the other of which is diametrically separable from the first part, a blade for each of said sockets, a radially outwardly extending flange on the inner end of each of said blades received in the corresponding of said grooves, and means for drawing the parts of said sockets into clamping relation solely with the flange of each blade.

7. An airplane propeller comprising, in combination, a hub having a plurality of radially disposed sockets, each of said sockets being interiorly provided with an annular groove having tapered side walls, a blade for each of said sockets, and an annular flange having tapered sides complementary to the side walls of said grooves on each of said blades received within the corresponding of said grooves and forming the sole means for securing said blades to said hub.

8. An airplane propeller comprising, in combination, a hub having a plurality of radially disposed sockets, each of said sockets being provided with an annular groove having tapered side walls, a blade for each of said sockets, and an annular flange, having tapered sides complementary to the side walls of said grooves, on each of said blades, said flanges being received within corresponding grooves in the sockets.

9. An airplane propeller comprising, in combination, a hub provided with a plurality of radially disposed sockets, a blade secured in each socket, said blade having an outwardly extending flange at its inner end forming the sole means for securing and clamping said blade in said socket.

10. An airplane propeller comprising, in combination, a hub having a plurality of radially disposed sockets, each of said sockets being provided interiorly with a groove the sides of which converge outwardly radially of the sockets, a blade for each of said sockets, and an annular flange on each blade received within a corresponding groove and forming the sole means for securing said blade to said hub.

11. An airplane propeller comprising, in combination, a hub having a plurality of radially disposed sockets, each of said sockets being provided with an internal groove, a blade for each socket, each of said blades having an outwardly tapering annular flange on its inner end, said flanges being receivable within corresponding grooves and forming the sole means for securing said blades to said hub.

12. An airplane propeller comprising, in combination, a hub having a plurality of radially disposed sockets each of said sockets being interiorly provided with a radially outwardly tapering annular groove, a blade for each of said sockets, an annular flange on each of said blades received within corresponding grooves in said sockets and forming the sole means for securing and clamping said blades to said hub, the walls of said grooves engaging the tapered sides of the respective flanges, and the ends of the flanges being spaced from the bottom wall of the grooves.

13. In an airplane propeller, in combination, a hub including a plurality of radially disposed blade sockets, each of said sockets having an internal annular groove of tapered section, a blade for each of said sockets, an annular flange of tapered section at the root of each blade, said flange of each blade being received within the groove of the corresponding socket with opposite surfaces thereof in clamping engagement with opposite faces of said groove for holding said blade against both axial and radial movements.

JOHN SQUIRES.